US012620697B2

(12) United States Patent
Dadgarpour et al.

(10) Patent No.: US 12,620,697 B2
(45) Date of Patent: May 5, 2026

(54) ULTRAWIDEBAND HYPERFLAT AND MESH GRID SISO/MIMO ANTENNA

(71) Applicant: GALTRONICS USA, INC., Tempe, AZ (US)

(72) Inventors: Abdolmehdi Dadgarpour, Kanata (CA); Sadegh Farzaneh, Kanata (CA); Farid Jolani, Kanata (CA); Julie Love, Kanata (CA); Jacob Van Beek, Kanata (CA); Brian Wixon, Salisbury, MD (US)

(73) Assignee: GALTRONICS USA, INC., Tempe, AZ (US)

(*) Notice: Subject to any disclaimer, the term of this patent is extended or adjusted under 35 U.S.C. 154(b) by 194 days.

(21) Appl. No.: 18/272,019

(22) PCT Filed: Dec. 30, 2021

(86) PCT No.: PCT/US2021/065687
§ 371 (c)(1),
(2) Date: Jul. 12, 2023

(87) PCT Pub. No.: WO2022/154969
PCT Pub. Date: Jul. 21, 2022

(65) Prior Publication Data

US 2024/0145909 A1 May 2, 2024

Related U.S. Application Data

(60) Provisional application No. 63/136,437, filed on Jan. 12, 2021.

(51) Int. Cl.
*H01Q 1/38* (2006.01)
*H01Q 1/12* (2006.01)
(Continued)

(52) U.S. Cl.
CPC ................. *H01Q 1/38* (2013.01); *H01Q 1/52* (2013.01); *H01Q 5/25* (2015.01); *H01Q 15/14* (2013.01); *H01Q 1/1271* (2013.01)

(58) Field of Classification Search
CPC combination set(s) only.
See application file for complete search history.

(56) References Cited

U.S. PATENT DOCUMENTS 8,350,638 B2 1/2013 White
2003/0142018 A1* 7/2003 Lange .................... H01Q 1/007 343/897
(Continued)

FOREIGN PATENT DOCUMENTS

CN 101953023 A * 1/2011 ............. H01Q 1/246

OTHER PUBLICATIONS

International Search Report issued on Jun. 24, 2022, for PCT/2021/065687.
(Continued)

*Primary Examiner* — Dimary S Lopez Cruz
*Assistant Examiner* — Brandon Sean Woods
(74) *Attorney, Agent, or Firm* — Bradley Arant Boult Cummings LLP; Henry B. Ward, III

(57) ABSTRACT

An ultrawideband ultra-flat antenna and an ultrawideband ultra-flat transparent antenna which maintains visibility while functioning in surfaces without sacrificing antenna performance. The antenna, when mounted, appears substantially invisible and includes a mesh grid antenna that does not use a radome. The mesh grid antenna is optically transparent and may be easily mounted on windows and ceiling of buildings.

16 Claims, 16 Drawing Sheets

(51) Int. Cl.

| | |
|---|---|
| ***H01Q 1/52*** | (2006.01) |
| ***H01Q 5/25*** | (2015.01) |
| ***H01Q 15/14*** | (2006.01) |

(56) References Cited

U.S. PATENT DOCUMENTS

| | | | | |
|---|---|---|---|---|
| 2007/0262906 | A1* | 11/2007 | Haim | H01Q 5/328 343/702 |
| 2008/0042410 | A1 | 2/2008 | Breed et al. | |
| 2008/0055175 | A1* | 3/2008 | Rebeiz | H01Q 19/30 343/754 |
| 2008/0165063 | A1 | 7/2008 | Schlub et al. | |
| 2009/0140938 | A1 | 6/2009 | Ishibashi et al. | |
| 2009/0213012 | A1 | 8/2009 | Jiang et al. | |
| 2014/0060921 | A1* | 3/2014 | Reul | H01Q 1/526 29/601 |
| 2016/0204513 | A1* | 7/2016 | Yemelong | H01Q 9/40 343/769 |
| 2016/0344106 | A1* | 11/2016 | Rankin | H01Q 7/00 |
| 2017/0133767 | A1* | 5/2017 | Dorsey | H01Q 21/20 |
| 2018/0040955 | A1* | 2/2018 | Vouvakis | H01Q 9/065 |
| 2018/0062271 | A1* | 3/2018 | Toyao | H01Q 9/30 |
| 2018/0183134 | A1* | 6/2018 | Jan | H01Q 3/24 |
| 2022/0190470 | A1* | 6/2022 | Wu | H01Q 1/521 |

OTHER PUBLICATIONS

Written Opinion issued on Jun. 24, 2022, for PCT/2021/065687.

M. Kashanianfard and K. Sarabandi, "Vehicular optically transparent UHF antenna for terrestrial communication," IEEE Trans. Antennas Propag., vol. 65, No. 8, pp. 3942-3949, Aug. 2017.

O. Yurduseven, D. Smith, and M. Elsdon, "A transparent meshed solar monopole antenna for UWB applications," In Proc. 8th Eur. Conf. Antennas and Propagation, The Hague, The Netherlands, 2014, pp. 2145-2149.

P.D.Tung, C.W.Jung, "Optically Transparent Wideband Dipole and Patch External Antennas Using Metal Mesh for UHD TV Applications," IEEE Trans. Antennas Propag., vol. 68, No. 3, pp. 1907-1917, Mar. 2020.

T. Peter, R. Nilavalan, H. F. AbuTarboush, and S. W. Cheung, "A novel technique and soldering method to improve performance of transparent polymer antennas," IEEE Antennas Wireless Propag. Lett., vol. 9, pp. 918-921, Sep. 2010.

A. Katsounaros, Y. Hao, N. Collings, and W. A. Crossland, "Optically transparent antenna for ultra wide-band applications," in Proc. 3rd Eur. Conf. Antennas and Propagation, 2009, pp. 1918-1921.

K. Bahadori and Y. Rahmat-Samii, "A Miniaturized Elliptic-Card UWB Antenna With WLAN Band Rejection for Wireless Communications," IEEE Trans. on Antennas and Propagation, vol. 55, No. 11, pp. 3326-3332, Nov. 2007.

C.R. White, H.J. Song, and E.Yasan, "A Wideband Stick-On Connector for CPW-Fed On-Glass Antennas," IEEE Antennas Wireless Propag. Lett., vol. 9, pp. 171-174, 2010.

Mo, T.T., Xue, Q., and Chan, C.H.: 'A broadband compact microstrip rat-race hybrid using a novel CPW inverter', IEEE Trans. Microw. Theory Tech., 2007, 55, (1), pp. 161-167.

International Preliminary Report on Patentability issued on Jul. 4, 2023, for PCT/US2021/065687.

* cited by examiner

ULTRAWIDEBAND HYPERFLAT AND MESH GRID SISO/MIMO ANTENNA

TECHNICAL FIELD

The present invention relates to a transparent antenna with ultrawideband performance. More specifically, the present invention relates to antennas that are deployable on flat surfaces and on transparent substrates. These antennas can be deployed on vehicle windshields, on satellite installed solar cells, and in other commercial and medical applications.

BACKGROUND

With the rapid development of wireless communication systems, in particular the emergence of the next generation of wireless networks (5G), there is an imperative to assign more access points and signal repeaters. In addition, there is an imperative to have more base stations in different locations to thereby increase the network capacity and mobile network. However, assigning more access points, of which the antenna is a part, provides infrastructure challenges for urban areas. These challenges include using existing antennas as these current antennas are not ideal due to their bulky size and their inability to blend with surrounding environment as well as their opaque appearance.

It is quite well-known that current antennas cannot be used with transparent windows—current antennas are non-transparent and most of these antennas use radomes that increase their undesirable visibility. In addition, existing antenna structures cannot be blended into ceilings or walls of locations such as hospitals, shopping malls, schools, and convention centres due to their bulky structure.

While flat structures related to antennas is known, current flat antennas are equipped with radomes for mechanical protection as well as for hiding the antenna substrate layer and copper traces.

Another issue with current antennas is their bulky structure as some implementations require a minimization of the depth or protrusion of the antenna toward the floor to render the antenna unobtrusive. As noted above, current antennas are usually equipped with a corresponding large radome, thereby rendering these antennas very noticeable.

There is therefore a need for systems, devices, and methods that provide for antennas that are unobtrusive and not very noticeable. Preferably, such antennas are deployable on transparent substrates and allows for wideband performance suitable for current and future wireless applications.

SUMMARY

The present invention provides an ultrawideband ultra-flat antenna and an ultrawideband ultra-flat transparent antenna which may maintain visibility while functioning in the surfaces without sacrificing the antenna performance. In other words, the antenna once mounted appears substantially invisible. To alleviate the above-described issues with known structures, the present invention includes a mesh grid antenna is designed without a radome and which is optically transparent and may be easily mounted on the windows and ceiling of buildings.

In a first aspect, the present invention provides an antenna structure comprising:

a wire mesh provided on a patch and a ground plane;

an adhesive layer for attaching said wire mesh to a substrate; and a polyester film provided between said adhesive layer and said substrate.

In a second aspect, the present invention provides an antenna structure comprising:

a wire mesh provided on a patch and ground plane;

an adhesive layer for attaching said wire mesh to a substrate;

a polyester film provided between said adhesive layer and said substrate; and a reflector adjacent to and spaced apart from said substrate;

wherein when said wire mesh is attached to said substrate, a surface of said substrate is substantially planar and flat.

In a third aspect, the present invention provides a coupling structure for use with an antenna structure, the coupling structure comprising:

a first coplanar waveguide coupled to a microstrip line, said microstrip line feeding said antenna structure;

a second coplanar waveguide mounted upon a substrate; and a solder mask layered between said first and second coplanar waveguides;

wherein when a signal is present on said microstrip line, said signal capacitively couples from said first coplanar waveguide to said second coplanar waveguide.

In a fourth aspect, the present invention provides an antenna structure comprising:

a monopole antenna fed by at least one cable;

a reflector adjacent said monopole antenna;

an L-shaped metal plate adjacent said reflector;

wherein said at least one cable is capacitively coupled to said metal plate

BRIEF DESCRIPTION OF THE DRAWINGS

The present invention will now be described by reference to the following figures, in which identical reference numerals refer to identical elements and in which.

DETAILED DESCRIPTION

In one implementation, the present invention includes an ultra-flat MIMO antenna that is designed with a thickness of less than 1.5 mm, the thickness of RF laminate without using a radome. To increase structural strength and to allow the antenna to blend in with its surrounding environment, three layers of solder mask may be incorporated with a desired color. Also, in another implementation, the present invention includes an ultra-flat transparent antenna, a mesh grid monopole antenna with a CPW transmission feedline and that is designed to cover the frequency range of 600 MHz to 6 GHz. This antenna is printed on polycarbonate as a transparent substrate to further increase the transparency of the antenna. Since the magnitude of surface current varies with frequency, the solid copper is converted into different patterns such as elliptical and circular mesh traces based on the trend of the dominant surface current at each of the sub-bands. In another implementation of the present invention, an ultra-wideband capacitive coupling microstrip to CPW transition is used to achieve a PIM level of better than −153 dBc. This transition is designed to cover an antenna's bandwidth and to facilitate the soldering of RG141 cable to the feed point of an antenna operating from 600 MHz to 6 GHz.

The present invention is in contrast with the conventional approaches to implementing transparent antennas. In the first approach, a mesh grid is evenly applied on metal-based conductors and this permits light to pass through the mesh traces. In most implementations, the metal conductors are modified as square patterns to make as much of the surface as transparent as possible. The second approach involves using transparent conductors such as conductive inks, conductive polymers, silver-coated polyester film (AgHT), as well as Indium-Tin-Oxide (ITO) and transparent conductive oxides (TCO).

Unfortunately, these approaches are problematic. For antennas that use metal conductors, the metal conductors as square patterns deteriorates the antenna performance and the results are not the same as a solid counterpart due to the changing of surface current in a mesh grid structure. Most importantly, all of the current mesh grid designs are limited to narrow band antennas which are not suitable for ultra-wideband performance. Similarly, using transparent conductors as antennas is not feasible for lower frequencies (such as 600 MHz) because these transparent conductors cannot be built in the light of the small thicknesses as opposed to the skin depth. Additionally, the passive intermodulation of such antennas does not meet industrial requirements of −153 dBc.

Figure 1:
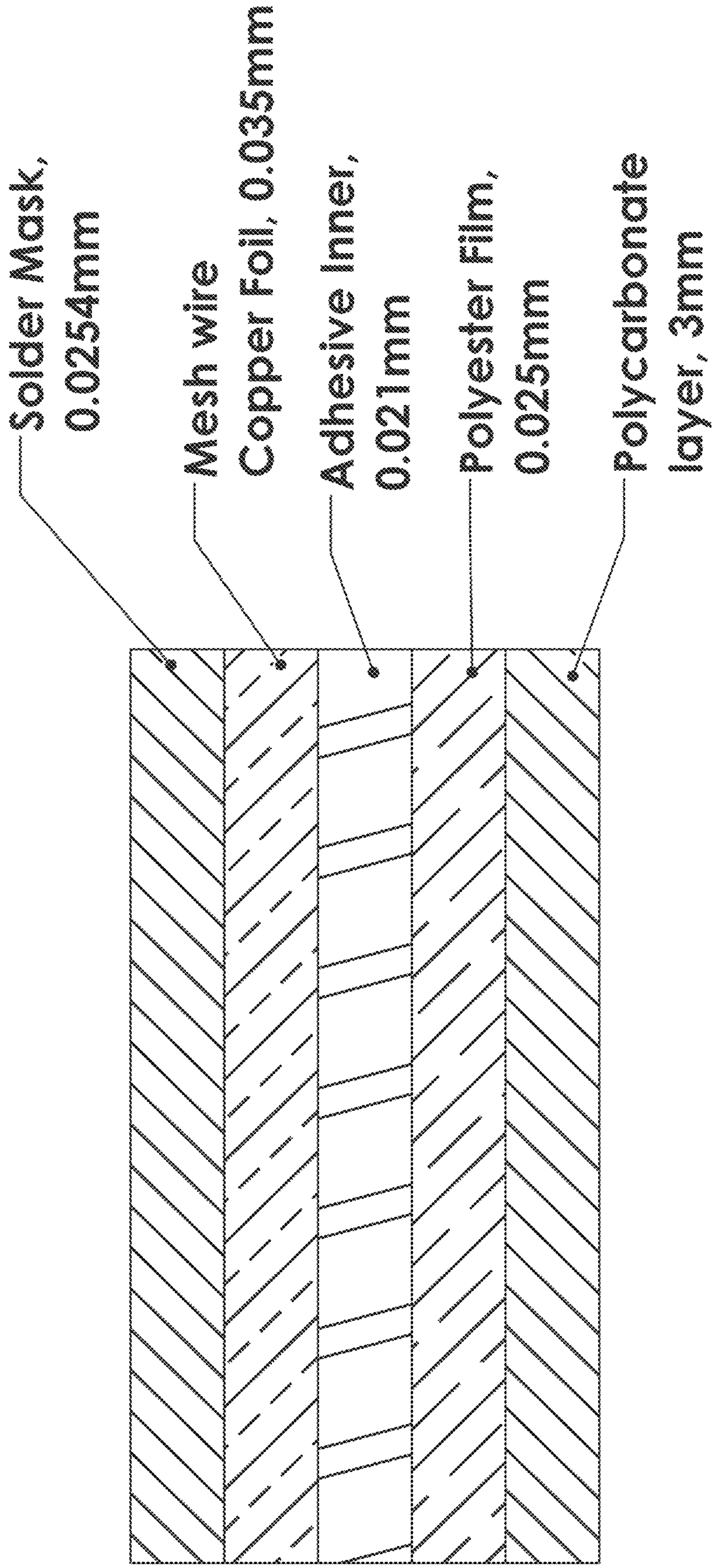
FIG. 1 is a cross-sectional schematic of layering within a Mesh-Grid CPW monopole antenna in accordance with the present invention.

Referring to FIG. 1, shown is a cross-sectional schematic of layering within a Mesh-Grid CPW monopole antenna in accordance with one aspect of the present invention. Because transparent conductors are difficult to build at lower frequencies (such as 600 MHz) because of its small thickness as opposed to skin depth and also due to the deterioration of the passive inter modulation, the preferred solution in accordance with the present invention is to utilize the wire mesh on the patch and ground plane of a monopole antenna while using an adhesive layer to attach those mesh grids onto the transparent substrate (such as polycarbonate). The schematic of this process is shown in FIG. 1. It should be mentioned that the adhesive layer and polyester layer are preferably transparent and not opaque. As can be seen from FIG. 1, the bottom layer is the polycarbonate substrate. Atop this is a polyester film. Atop the film is the adhesive layer. A mesh wire copper foil is then atop the adhesive layer and a solder mask is the topmost layer. It should be clear that the thicknesses of the various layers detailed in FIG. 1 are merely preferred or recommended dimensions and should not be taken as necessary for implementation.

Figure 2:
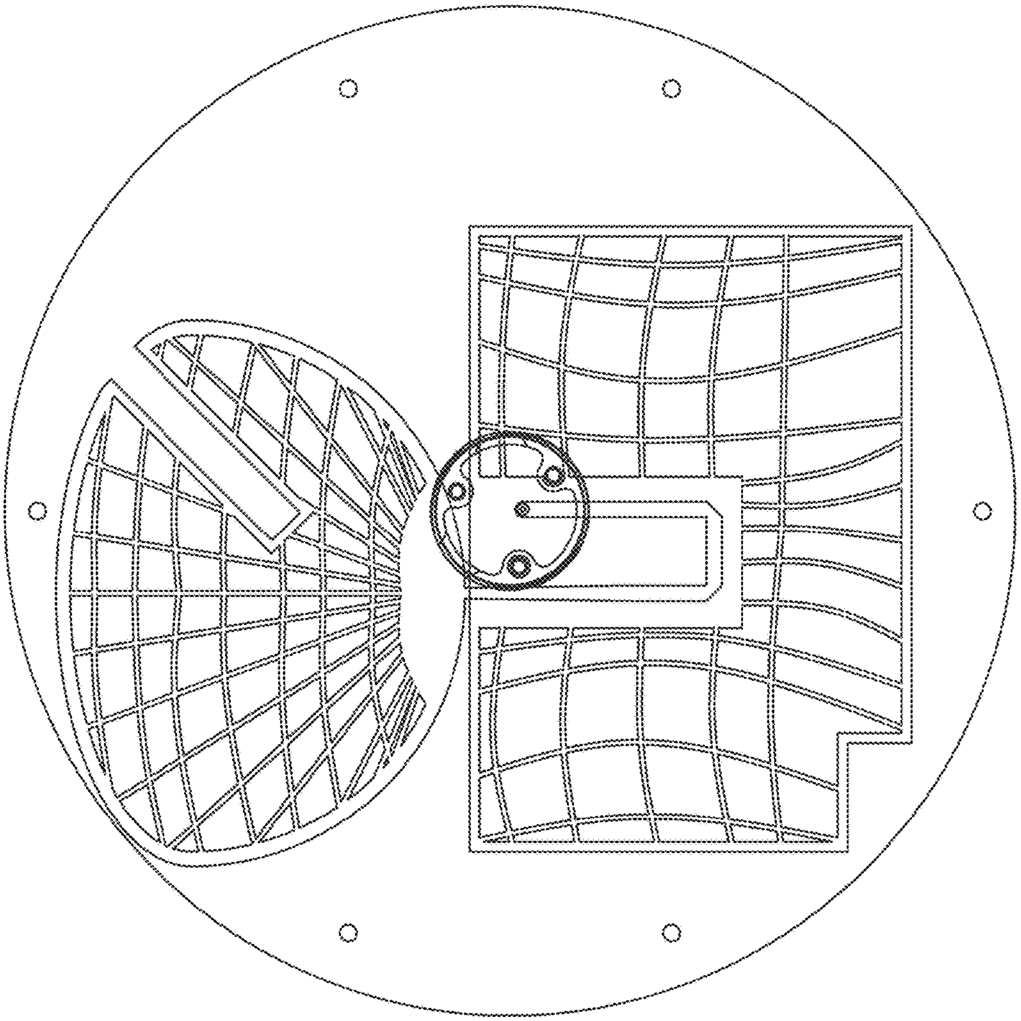
FIG. 2 is a schematic of a Mesh-Grid microstrip fed monopole SISO antenna in accordance with one aspect of the present invention.

To apply the multi-layer approach to microstrip configurations, a monopole antenna as shown in FIG. 2 was designed. This monopole antenna is fed by a microstrip line and uses the mesh wire approach based on dominant surface current distribution at each sub-band. For this design, one objective was to fit the monopole antenna into a circular substrate layer with a diameter of less than 8 inches. Preferably, the antenna is excited in the centre of the circularly shaped polycarbonate. To this end, the diameter and dimensions of the monopole were modified and this, in turn, affected the impedance matching of the antenna at lower frequencies. To compensate for this, the size of the ground plane was increased and the antenna was shifted and was located in the off-axis of the ground plane. Since most of the power is concentrated on the outer perimeter of the radiator and ground plane, the mesh wire with a wider trace was applied in those regions. However, the mesh grid for the remaining parts of the radiator and ground plane was chosen to have a thinner trace so as to improve visual transparency.

Figure 3:
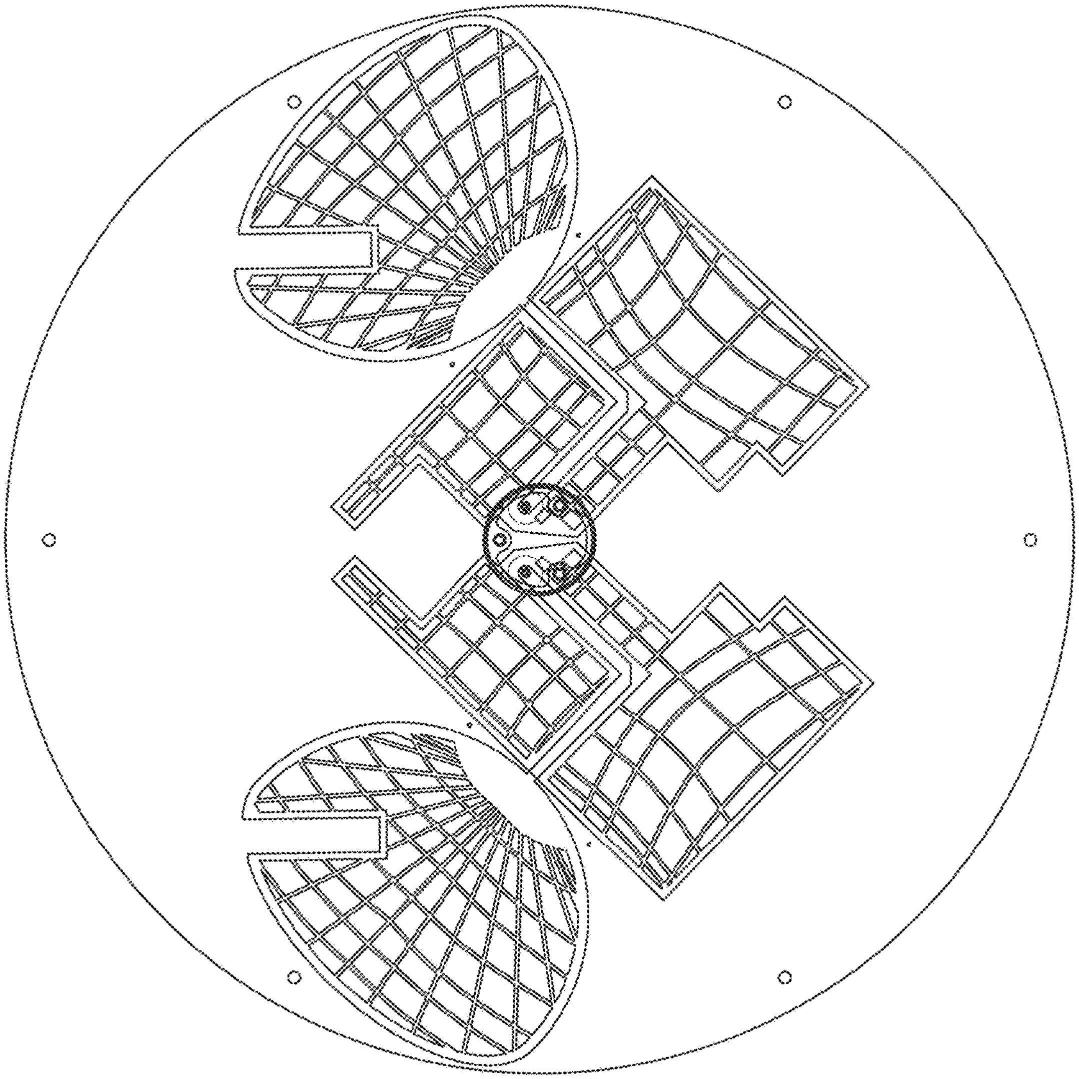
FIG. 3 is a schematic of a Mesh-Grid microstrip fed monopole MIMO antenna in accordance with another aspect of the present invention.

In addition to the microstrip line fed mesh grid SISO antenna illustrated in FIG. 2, a microstrip line fed mesh grid MIMO antenna was also designed. Such an antenna is illustrated in FIG. 3. This MIMO antenna in FIG. 3 consists of two SISO antennas that are perpendicular to one another.

Figure 4:
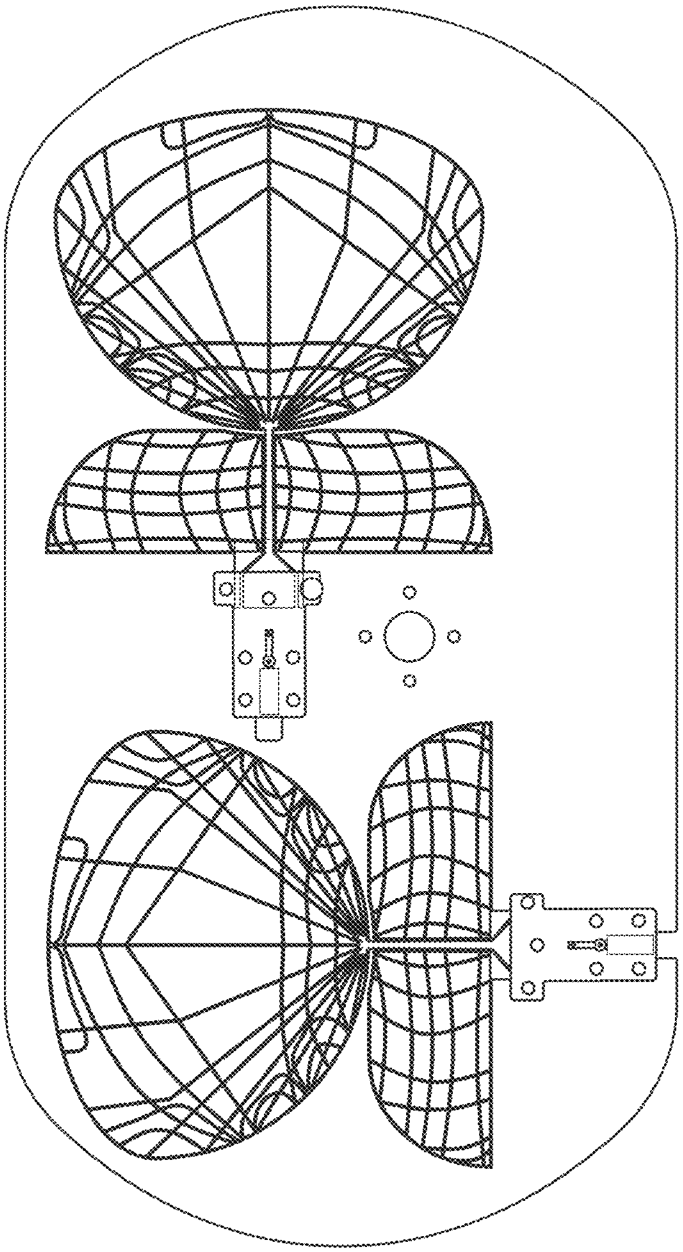
FIG. 4 is a schematic of a Mesh-Grid CPW-fed monopole MMO antenna in accordance with a further aspect of the present invention.

It should be clear that one reason for designing the microstrip line is that it has a better performance than CPW in terms of PIM value. Furthermore, soldering of the coaxial cable to the antenna feed (an option for a microstrip line) is much more feasible and convenient than with the CPW. It should also be clear that, in another implementation of the present invention, a mesh grid antenna using a coplanar waveguide (CPW) transmission line is also possible. Referring to FIG. 4, illustrated is a CPW transmission line fed mesh grid MIMO monopole antenna. One advantage of using a CPW transmission line is that the copper traces only occupy the top side of the substrate layer and this assists the antenna to appear more transparent when compared to other technologies such as microstrip line.

It should be clear that a mesh grid antenna, whether fed by a microstrip line or a CPW transmission line, can be any shape or any combination of shapes such as rectangular, triangular, or circular. However, it has been found that a combination of circular and elliptical shapes provides performance in terms of impedance matching.

Figure 5A:
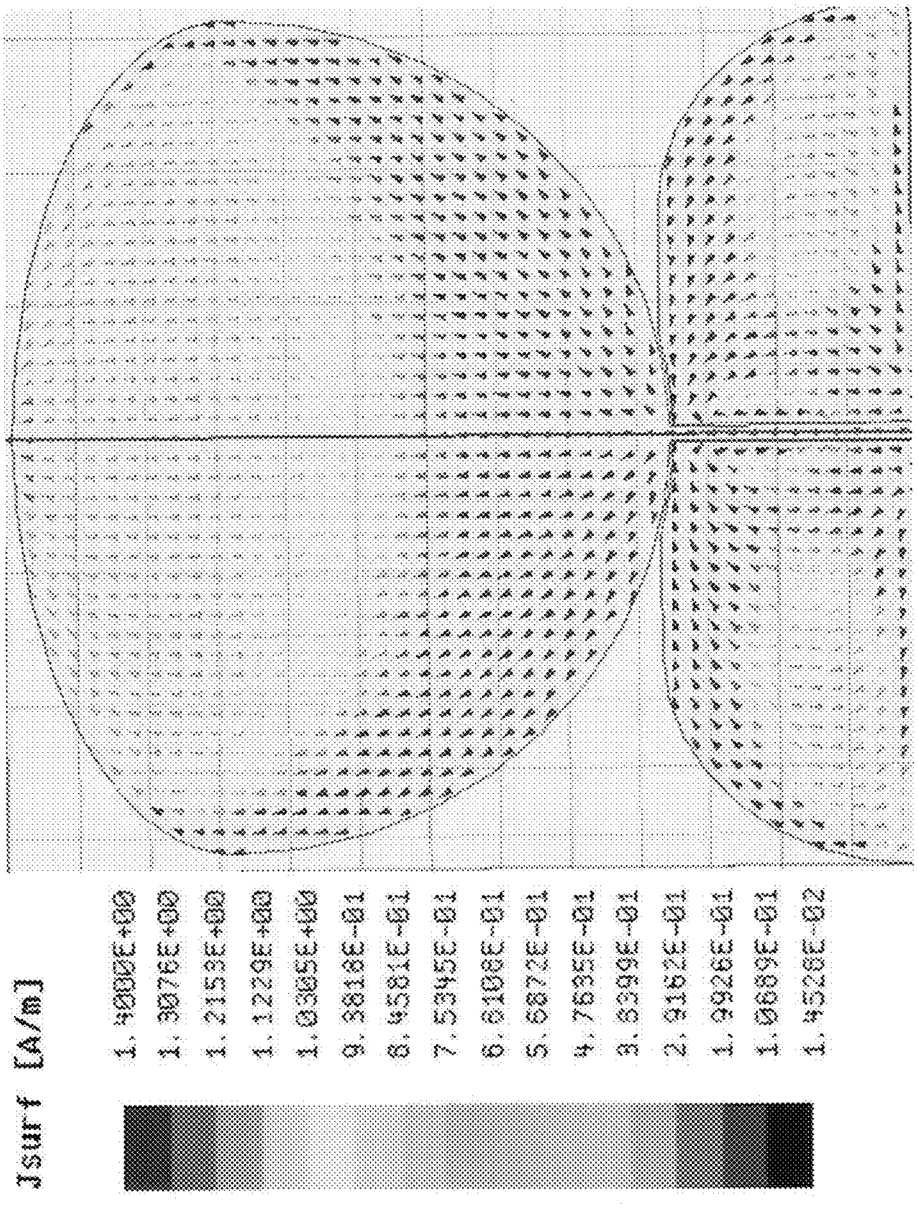
FIGS. 5(*a*), 5(*b*), and 5(*c*) graphically show the surface current distribution at (a) 770 MHz, (b) 2 GHz, (c) 3.5 GHz in accordance with the present invention.
Figure 5B:
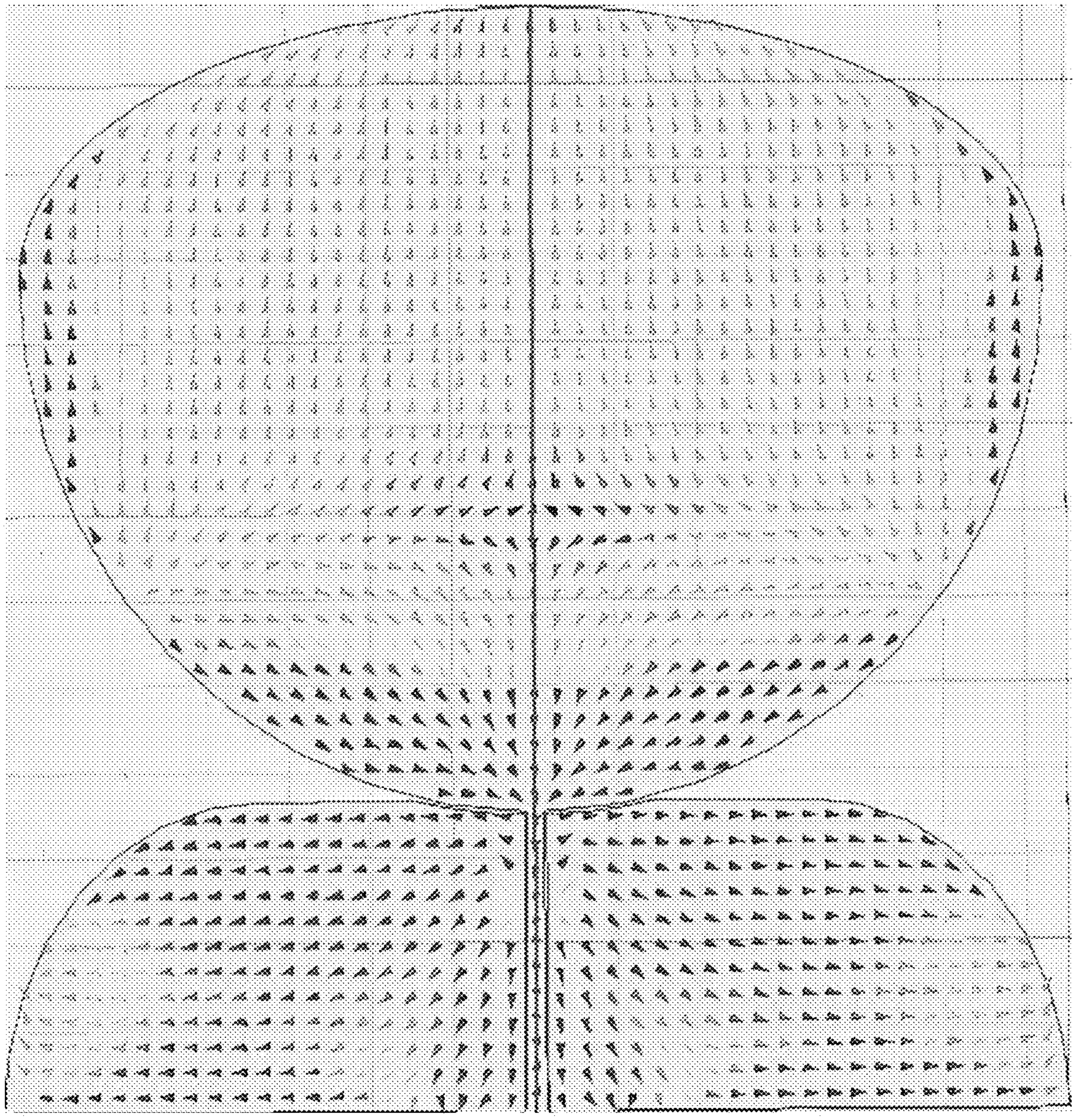
Figure 5C:
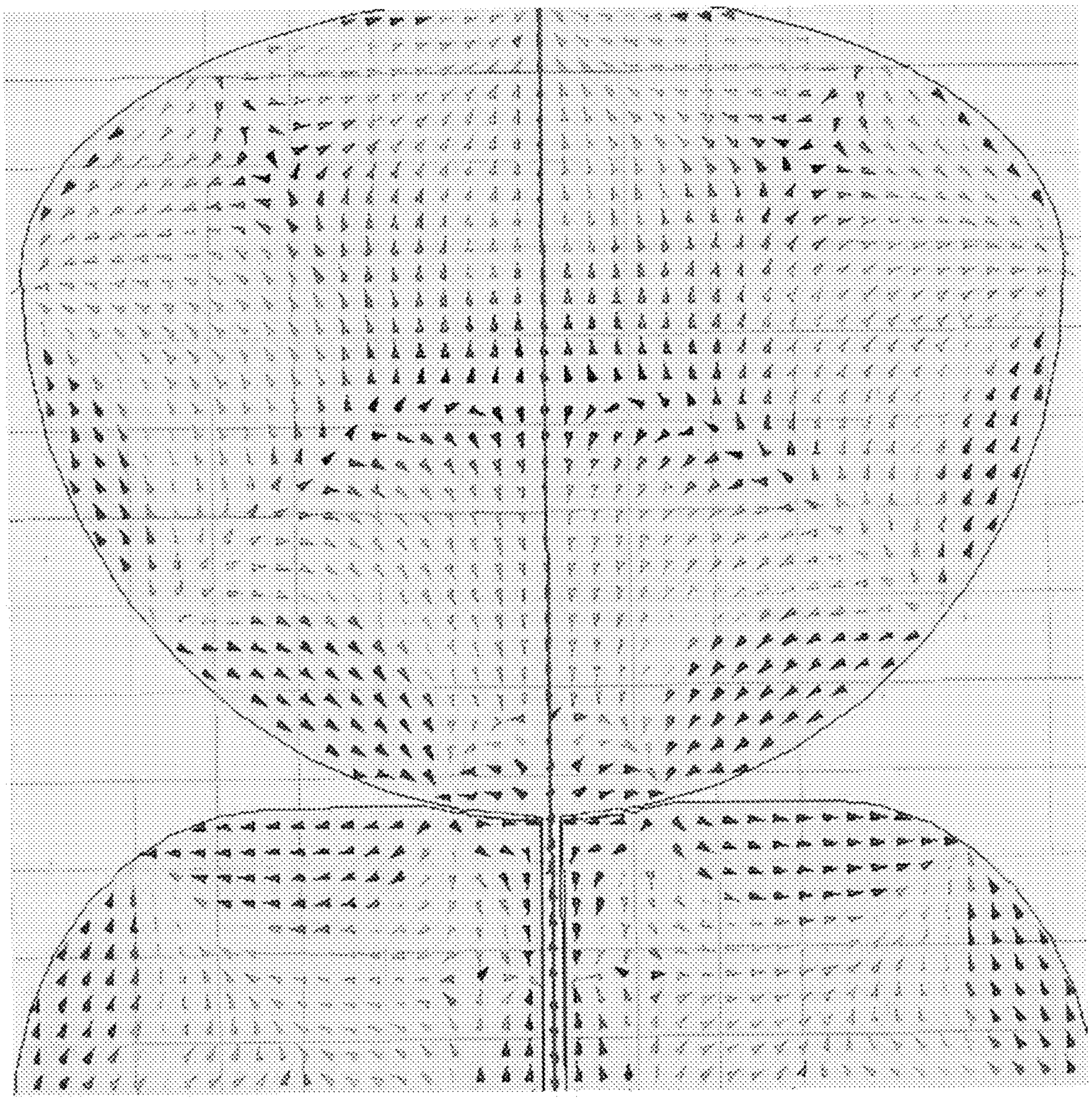

To implement the mesh wire technique used in the antennas illustrated in FIGS. 3 and 4, the current distribution of the solid metal antenna at different frequency bands was plotted to follow its trend. These plots can be seen in FIGS. 5(*a*), 5(*b*), and 5(*c*). As can be seen, for example, the current distribution at 770 MHz clearly shows that current is concentrated on the outer region of the radiator as well as ground plane. As a result of this observation, mesh wire was applied accordingly and result is that antenna shown in FIG. 4. As can also be seen, the current distribution at 2 GHz is mostly located on the bottom part of radiator and lines up horizontally. Also, some current surface density is reinforced on the junction of circular and elliptical shapes for the 2 GHz sub-bands. The surface current distribution at 3.5 GHz is concentrated along the outer area of radiator and ground and traverses a line of a sinusoidal function as can be observed in FIG. 5(*c*). Furthermore, it can be seen that the magnitude of surface current density in the centre of the radiator has less impact at those three sub-bands. Because of this, a lesser amount of mesh wire grid can be applied to thereby improve the visual transparency of the antenna.

It should be clear that the antenna can have a shape that is suitable for the desired end result. For the antenna in FIG. 2, the shape (a combination of circular and elliptical shapes) was initially selected to provide a good solid radiator and to provide good impedance matching over 0.617-6 GHz. The antenna shape is based on the monopole antenna concept but has been optimized to cover this specific frequency band. The surface current distribution at each sub-band was then plotted and, based on the dominant surface currents, more or less mesh wires were applied to improve visual transparency.

Providing a feed to the antenna according to the present invention can be problematic. The antenna is printed on the polycarbonate layer and this type of polymer-based plastic material is not capable of tolerating the thermal soldering, a common way of soldering an antenna feed point to a coaxial cable. In fact, thermal soldering results in a poor connection and degrades the antenna performance. One alternative approach is to deploy cold soldering or nonthermal soldering that uses conductive paste, a better solution than the thermal soldering. However, this technique also results in the degradation of antenna performance such as impedance matching and efficiency.

Figure 6:
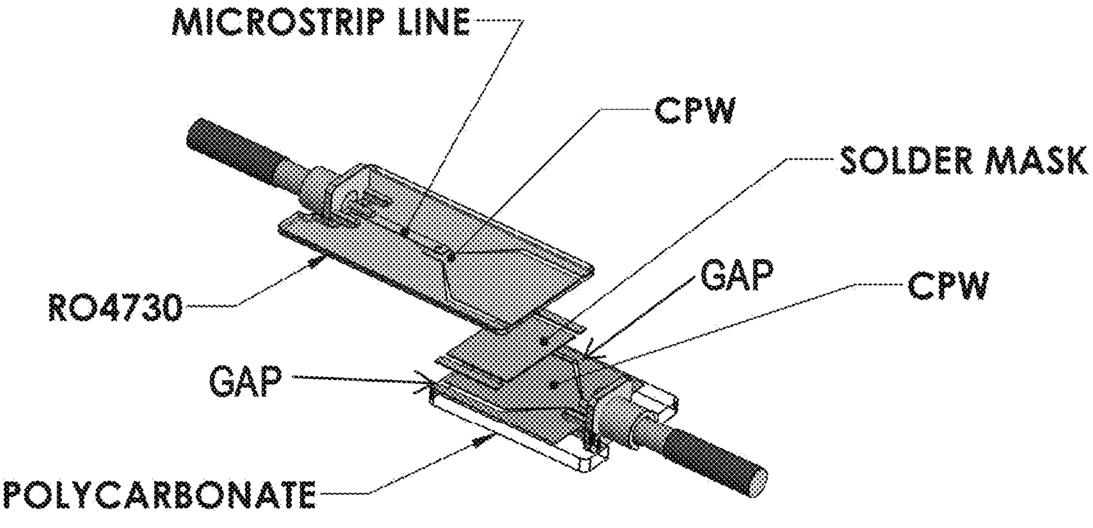
FIG. 6 is a schematic of capacitively coupled Microstrip-to-CPW transition in accordance with the present invention.

To address the above-mentioned issue, a capacitive coupling transition shown in FIG. 6 was used. This coupling structure uses a microstrip line printed on RO4730 with a thickness of 0.5 mm. The microstrip line is connected to a narrow width 50 ohm CPW transmission line on the other surface of the substrate by means of a via. This CPW transmission line is on a bottom of the RF laminate board with the microstrip line being on top of the RF laminate board. To improve the impedance matching of microstrip-to-CPW line, a triangular slot is cut on the ground plane shown in FIG. 6. The narrow width 50 ohm CPW line on the RF laminate board is tapered and attaches to another 50 ohm CPW line that has a wider trace on the bottom of the RF laminate board. The signal on the wider trace CPW line on the bottom of the RF laminate board capacitively couples to a wider trace CPW line on the polycarbonate board. To remove any metal-to metal contact between the two wide trace CPW lines, a solder mask is utilized between the wide trace CPW line on the RF laminate board and the wide trace CPW line polycarbonate board. Metal to metal contact between the CPW lines on the polycarbonate board and the RF laminate board would affect the PIM performance of the antenna.

For clarity and as can be seen from FIG. 6, there is a microstrip line on top of the laminate board RO4730. This microstrip line is connected, by way of a via, to a narrow CPW line on the bottom of the laminate board. This narrow CPW line is attached to a wider CPW line that is also on the bottom of the laminate board. Then, on top of the polycarbonate board, there is a wide trace CPW line. It should be clear that there is no physical contact between the CPW lines on the laminate board and on the polycarbonate board as the solder mask prevents such contact. The signal travels from the microstrip line to the CPW line on the bottom of the laminate board and then capacitively couples to the CPW line on top of the polycarbonate board.

It should be mentioned that, to achieve a better transition over a large frequency bandwidth of 600 MHz to 6 GHz, more capacitive coupling is required. To realize great capacitive coupling, it is helpful to increase the overlap between the wide trace CPW line on the bottom of the laminate board and the wide trace CPW line on the top of the polycarbonate board. In fact, as the surface area of the overlap increases, the capacitive coupling also increases. To review this aspect, a parametric study was conducted and it was found that that 50 ohm CPW traces with a width of 15 mm provided suitable capacitive coupling. To make a smooth transition between the two 50 ohm CPW lines (the CPW line on the bottom of the laminate board and the CPW line on the top of the polycarbonate board), the traces were tapered. It was also found that, to hold and precisely align the first substrate (RO4730 or the RF laminate board) with the polycarbonate board it preferred that the gap between trace and ground plane be large enough to avoid any short circuited signal. To this end, it was found that a 1 mm gap between the trace and the ground plane was suitable. This gap that separates the signal trace from the ground trace in the CPW is illustrated in FIG. 6.

Additionally, to improve PIM level, it was found that the diameter of via is preferably in the order of 0.8 mm and that the sharp edge corner of CPW be rounded. With such configurations, the PIM value improved significantly.

Figure 7:
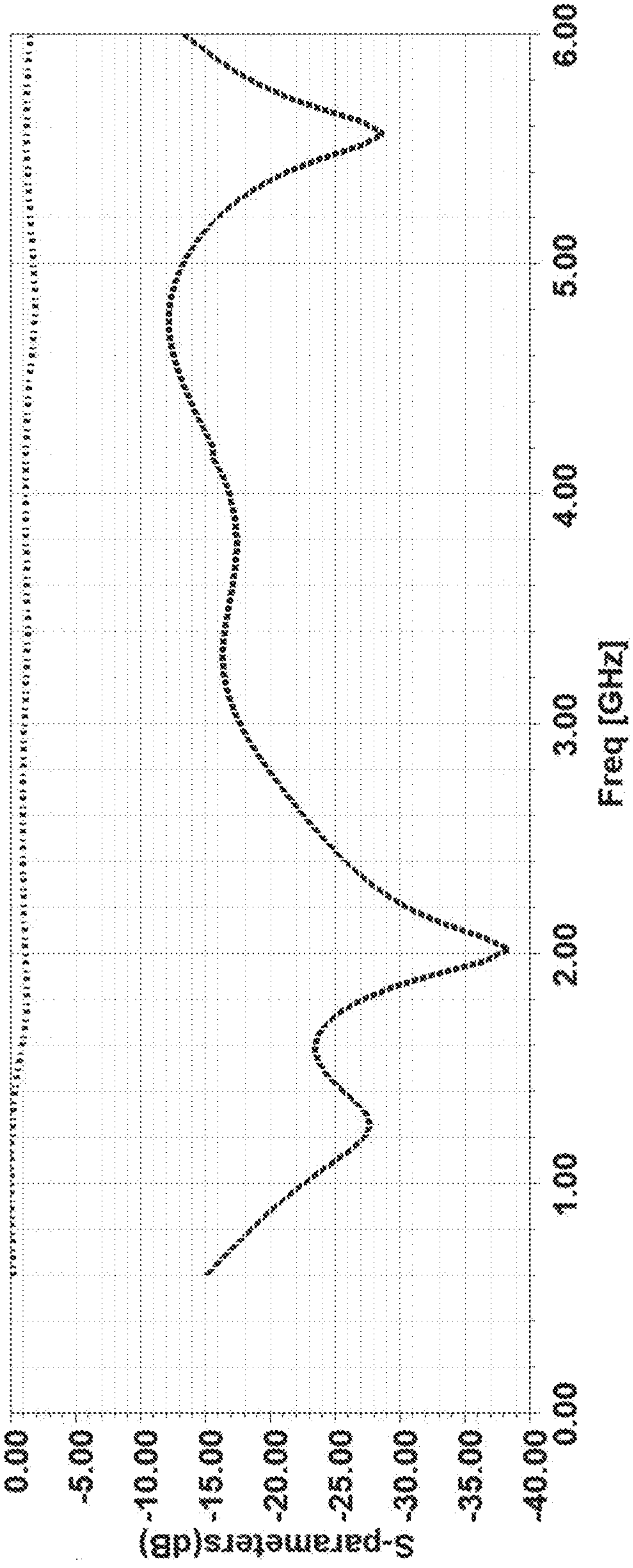
FIG. 7 is an S-parameter of a capacitively coupled Microstrip-to-CPW transition in accordance with the present invention.

The resultant s-parameters of structure according to one aspect of the present invention is as shown in FIG. 7. It can be seen that the impedance matching of port 1 is better than −15 dB over frequency band of 0.6 GHz to 4 GHz. Also, the matching from 5-6 GHz is less than −11 dB. In addition, it can be seen that the insertion loss is less than −1.3 dB over whole frequency band.

Figure 8:
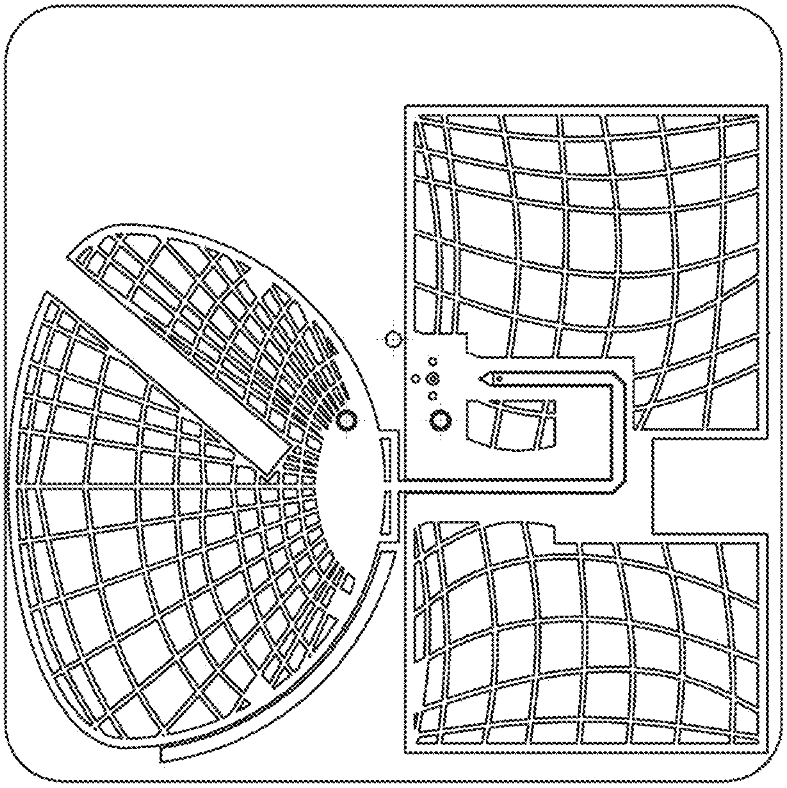
FIG. 8 is a schematic of a Mesh Grid SISO antenna fed by microstrip-to-CPW transmission line in accordance with the present invention.
Figure 9:
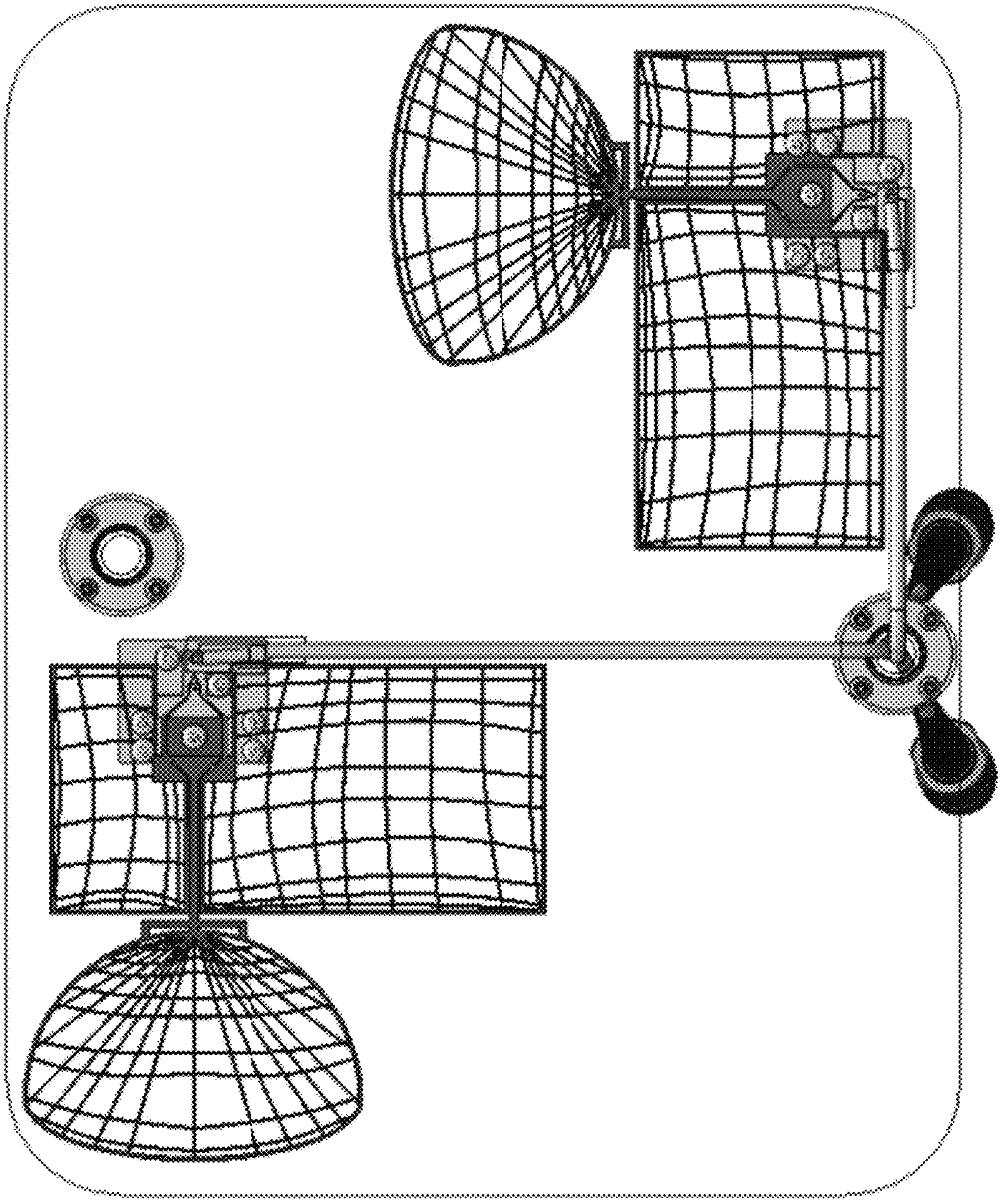
FIG. 9 is an arrangement of a mesh grid microstrip-to CPW monopole MIMO antenna in accordance with the present invention.

It should be understood that differing configurations of the CPW monopole antenna are possible without straying from the intended scope of the present invention. Different configuration and structures for the monopole antenna can be generated to cover the frequency range of 617 MHz to 6 GHz. To this end, a mesh-grid monopole antenna fed by a microstrip-to-CPW line is presented. FIG. 8 shows the schematic of mesh grid monopole SISO antenna fed by a CPW line. In this structure, a microstrip-to-CPW line has been tapered to improve the impedance matching at higher frequencies and a fork-shaped power divider was deployed to excite more modes at lower frequency and to improve the impedance matching. Using an E-shape splitter assists in shrinking antenna size. The impact of a semi-circular parasitic close to the edge of the radiator is to improve the matching at a desired frequency band and creates a notch at undesired frequency bands. A MIMO version of such an antenna as in FIG. 8 is also possible. A microstrip-to-CPW fed mesh grid monopole MIMO antenna is illustrated in FIG. 9. It should be clear that, with this arrangement, better isolation can be obtained.

Figure 10:
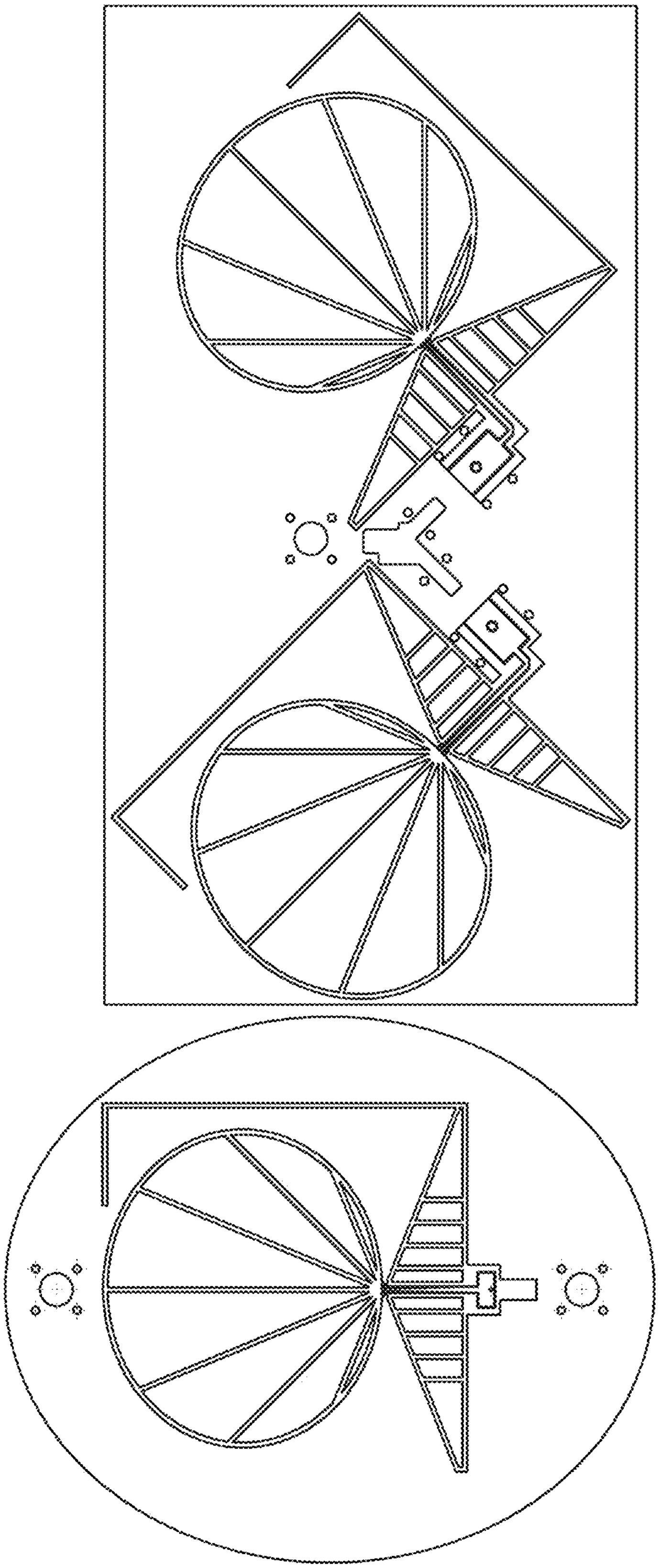
FIG. 10 is a series of two schematic diagrams showing the circular mesh grid monopole antenna fed with CPW, the left schematic diagram showing a SISO mesh grid monopole antenna and the right schematic diagram showing a MIMO mesh grid monopole antenna, both being in accordance with the present invention.

Another possible design of a mesh grid monopole antenna is that shown in FIG. 10. In this structure, the CPW line is tapered and a circular power divider is utilized to feed the antenna. The circular shape was selected as a radiator and the ground plane was tapered. Additionally, an L-shaped strip was added asymmetrically to the ground of the antenna to thereby improve impedance matching at lower frequency.

The various aspects of the present invention have many applications, one of which is distributed antenna systems. Distributed antenna systems (DAS) can be employed to support wireless signals within large buildings such as hospitals, schools, stadiums and shopping malls. In fact, due to the presence of concrete and metal, which blocks the signal and prevents signal penetration inside buildings, the DAS antenna is recommended to increase the signal quality. Generally, DAS antenna can be mounted near the window and into ceilings of buildings. To hide the antenna, DAS antennas are usually covered with a white radome. However, adding such a radome increases the protrusion dimension of the antenna, thereby rendering the antenna very noticeable.

Figure 11:
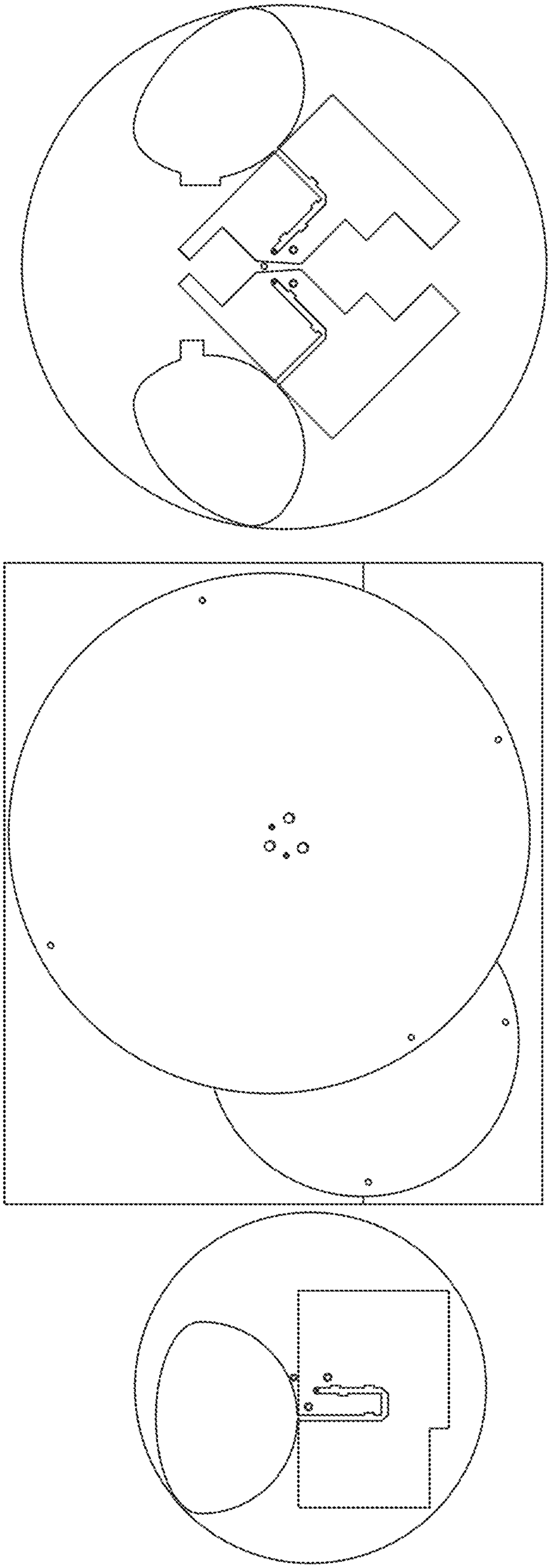
FIG. 11 is a photo and schematic diagrams of an ultra-flat antenna in accordance with the present invention with the left schematic diagram illustrating a SISO antenna and with the right schematic diagram illustrating a MIMO antenna.

To address the above issue, one aspect of the present invention provides for an ultra-flat MIMO antenna. In one implementation, the ultra-flat MIMO antenna has total thickness of 4 mm and no radome covers the antenna. To hide the copper traces of the antenna, three layers of solder mask of different colours (such as white, grey and black) were used. These layers of solder mask did not have any significant impact on antenna performance. A prototype ultra-flat SISO and MIMO antenna with a white solder mask is provided in FIG. 11. As can be seen from FIG. 11, the antenna does not use a radome. The left schematic diagram in FIG. 11 shows the SISO antenna while the right schematic diagram shows the MIMO antenna. The center picture illustrates a prototype with a white solder mask.

For this implementation of an ultra-flat antenna, a solid monopole antenna, which can be in any configuration and shape, was used and was printed on a regular substrate layer. To hide the antenna's traces two techniques were used. These were:

1-Applying three layers of solder mask (it can be used in different colors such as white, gray, black, etc.) on the top and bottom of the substrate layer;

2—Applying one layer of solder mask on the monopole trace and applying two layers of solder mask on the remaining parts of the PCB.

Figure 12A:
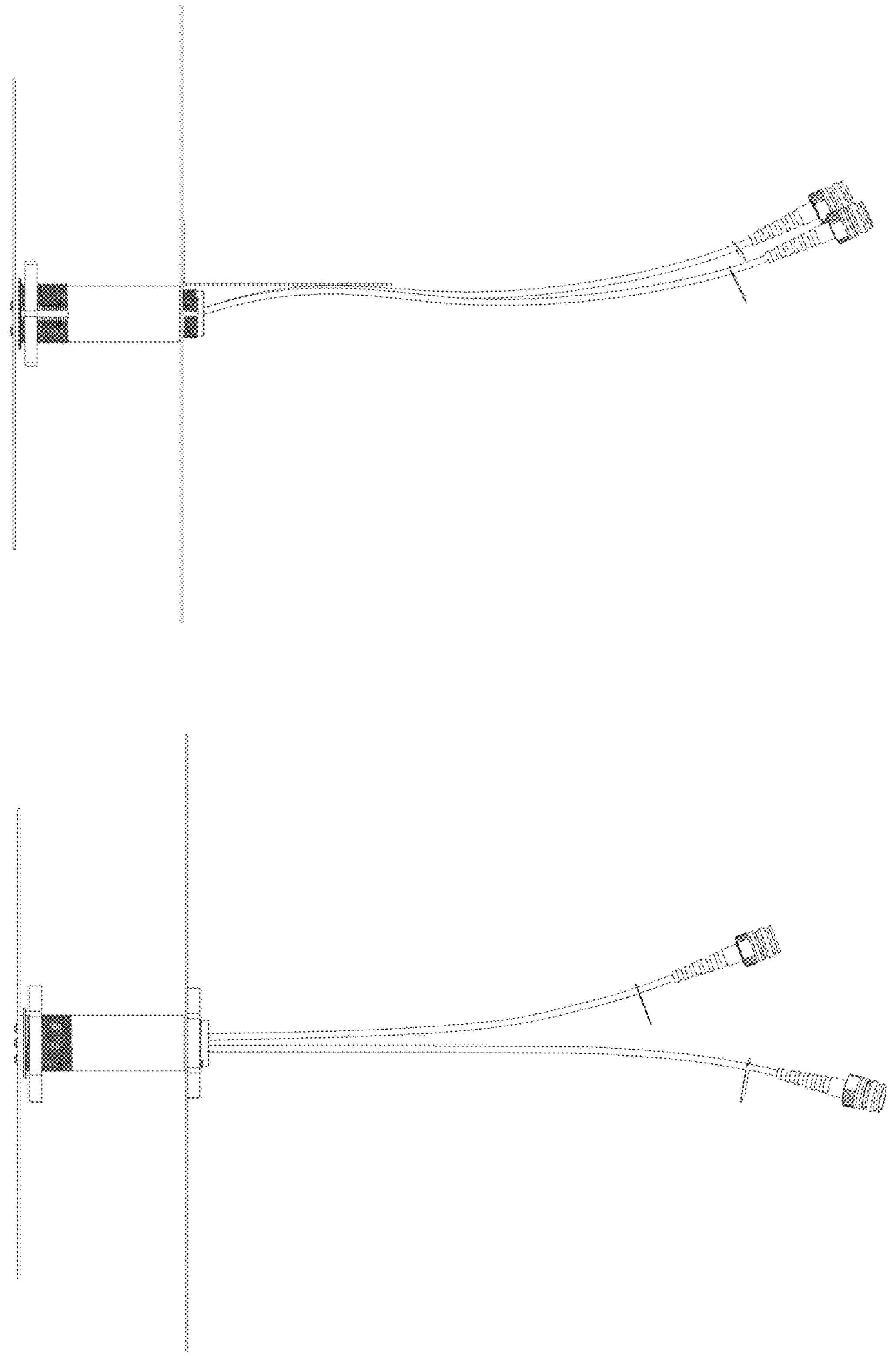
FIG. 12A shows an ultra-flat MIMO antenna backed with circular reflector along with a L-shaped metal plate outside the cavity in accordance with the present invention.
Figure 12B:
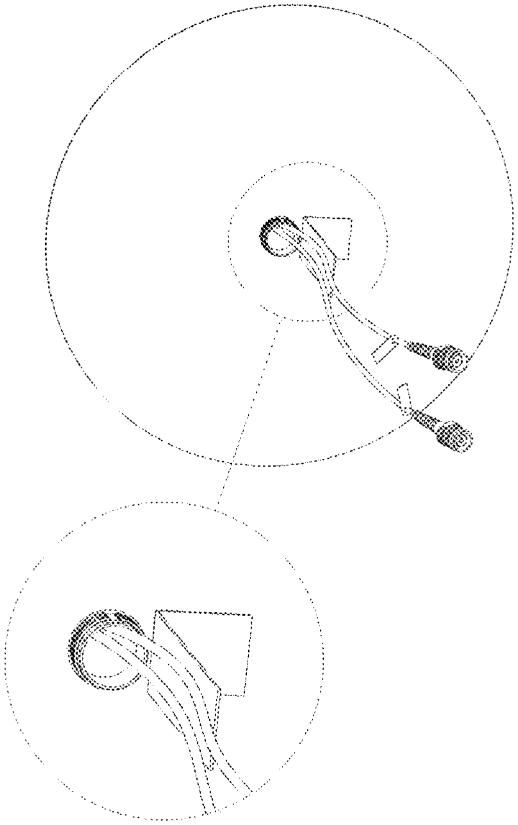
FIG. 12B shows the arrangement with the L-shaped plate in greater detail.

To suppress unwanted EM waves, a circular reflector may be used with the ultra-flat antenna. The circular reflector, in one implementation, was placed at the distance of 110 mm away from the monopole antenna. However, due to the use of this reflector and the presence of the coaxial cables (in particular for a MIMO option where two cables are close to one another), the resulting PIM value for the ultra-flat MIMO antenna at 700 HB is around −150 dBc. This value is less than ideal for some industry applications. This issue may be addressed using either of two innovative structures. One option is that illustrated in FIG. 12A. For this option, the ultra-flat MIMO is backed with a reflector and two cables are capacitively attached to an L-shaped aluminum plate connected to the reflector. The L-shaped metal plate removes the coupled current distribution on the adjacent cable and prevents it from resonating. The configuration of the L-shaped metal plate is shown in more detail in FIG. 12B. As can be seen from FIGS. 12A and 12B, for this configuration, the L-shaped metal plate extends away from the area between the antenna and the reflector.

Figure 13:
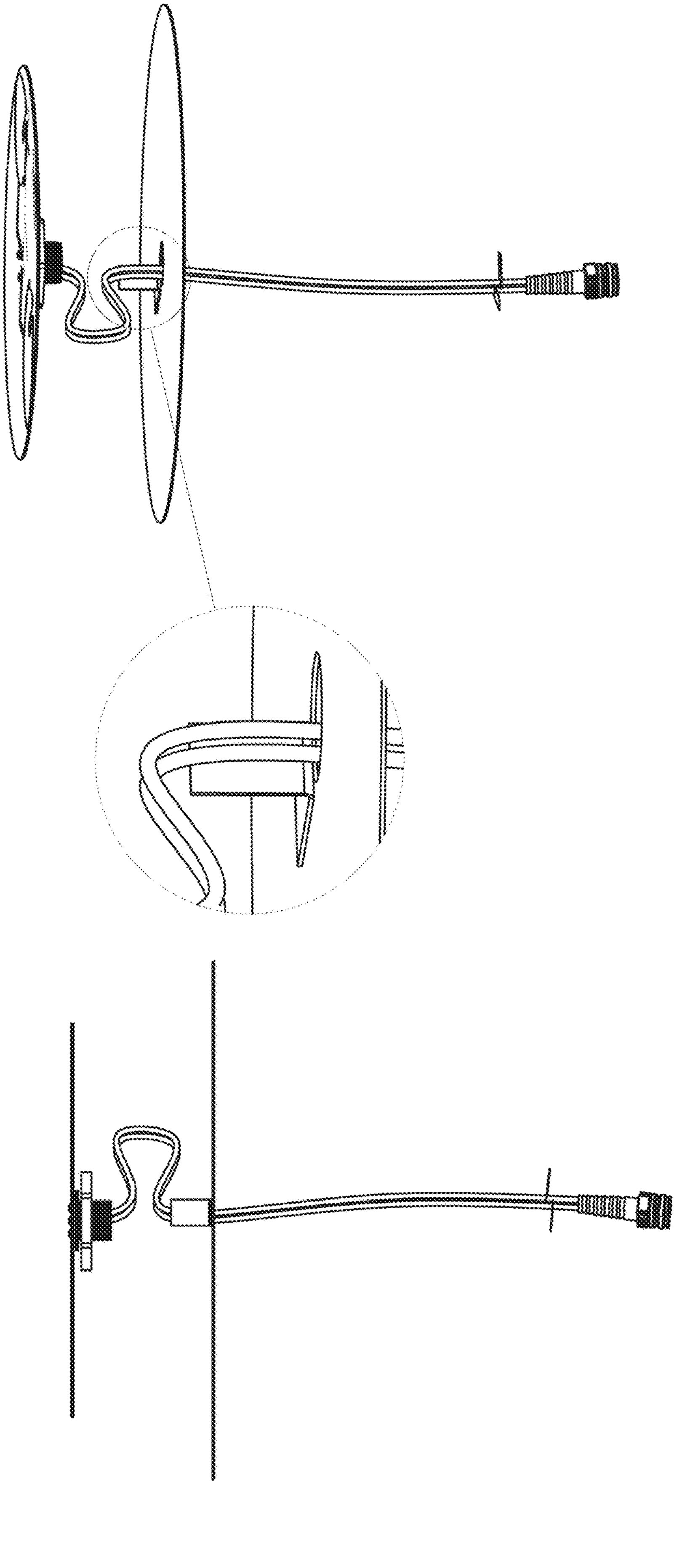
FIG. 13 is an ultra-flat MIMO antenna backed with circular reflector with L-shaped metal inside the cavity in accordance with the present invention.

Note that, while the above configuration may be advantageous, for some applications, the depth of the antenna cannot be increased. The second option is that illustrated in FIG. 13. For the option shown in FIG. 13, the coaxial cable is bent and the L-shaped metal plate is attached to the reflector and extends into the cavity or space (or area) between the reflector and the antenna. The coaxial cable is capacitively attached to the L-shaped metal plate to supress the unwanted current distribution coupled from the adjacent cable and to thereby remove the resonance.

It should be clear that the present invention has a number of various aspects. In one aspect, the present invention includes a transparent mesh-grid monopole antenna with an optimal performance of S11<−10 dB over the large frequency band of 617 MHz to 6 GHz. Similarly, in another aspect, the present invention includes a capacitive coupling microstrip-to-CPW transition operating in the large frequency band of 600 MHz to 6 GHz with S11<−15 dB. The present invention may, in yet a further aspect, further include an ultra-flat wideband monopole antenna that does not use a radome. A further aspect of the present invention further includes a novel structure for improving the PIM of the monopole antenna backed with a reflector.

It should be clear that alternative embodiments of the present invention may include using different combinations of a mesh grid on the radiator and ground plane. It is preferred that, for the mesh grid aspects of the present invention, the mesh wire have a width of about 0.5 mm or less and a pitch of about 15 or 10 mm to increase the grid's transparency. Regarding the capacitive coupling transition described above, it should be clear that the overlap between the trace located on the rigid substrate and the trace on the polycarbonate might impact or affect the transmitted signal toward the feed point of the antenna. Similarly, this overlap may also affect the input impedance matching of the transmission line. It should also be clear that adding more layers of solder mask on the ultra-flat antenna should not affect antenna performance and, as such, multiple variations regarding the layers of solder mask are possible.

As noted above, the mesh grid antenna according to the various aspects of the present invention may be used in distributed antenna system (DAS) applications and may be deployed on the windshields of self-driven cars. Additionally, this mesh grid antenna may also be employed to advance technologies such as the Internet of Things and may also be used in other commercial and medical applications such as wearable sensors.

The following references are of general background interest and are herein incorporated by reference.

Regarding the Mesh Grid monopole antenna, the reader's attention is directed to:

1-M. Kashanianfard and K. Sarabandi, "Vehicular optically transparent UHF antenna for terrestrial communication," IEEE Trans. Antennas Propag., vol. 65, no. 8, pp. 3942-3949, August 2017.

2-O. Yurduseven, D. Smith, and M. Elsdon, "A transparent meshed solar monopole antenna for UWB applications," in Proc. 8th Eur. Conf. Antennas and Propagation, The Hague, The Netherlands, 2014, pp. 2145-2149

3-P. D. Tung, C. W. Jung, "Optically Transparent Wideband Dipole and Patch External Antennas Using Metal Mesh for UHD TV Applications," IEEE Trans. Antennas Propag., vol. 68, no. 3, pp. 1907-1917, March. 2020.

4—T. Peter, R. Nilavalan, H. F. AbuTarboush, and S. W. Cheung, "A novel technique and soldering method to improve performance of transparent polymer antennas," IEEE Antennas Wireless Propag. Lett., vol. 9, pp. 918-921, September 2010

5—A. Katsounaros, Y. Hao, N. Collings, and W. A. Crossland, "Optically transparent antenna for ultra wide-band applications," in Proc. 3rd Eur. Conf. Antennas and Propagation, 2009, pp. 1918-1921

6-K. Bahadori, and Y. Rahmat-Samii, "A Miniaturized Elliptic-Card UWB Antenna With WLAN Band Rejection for Wireless Communications," IEEE Trans. on Antennas and Propagation, vol. 55, no. 11, pp. 3326-3332, November 2007.

Regarding the transition board, the reader's attention is directed to:

1-Connector assembly for providing capacitive coupling between a body and a coplanar waveguide and method of assembling, U.S. Pat. No. 8,350,638 B2

2—C. R. White, H. J. Song, and E. Yasan, "A Wideband Stick-On Connector for CPW-Fed On-Glass Antennas," IEEE Antennas Wireless Propag. Lett., vol. 9, pp. 171-174, 2010

3-Mo, T. T., Xue, Q., and Chan, C. H.: 'A broadband compact microstrip rat-race hybrid using a novel CPW inverter', IEEE Trans. Microw. Theory Tech., 2007, 55, (1), pp. 161-167

A person understanding this invention may now conceive of alternative structures and embodiments or variations of the above all of which are intended to fall within the scope of the invention as defined in the claims that follow.

We claim:

1. An antenna structure comprising:
a wire mesh provided on a patch and a ground plane;
an adhesive layer for attaching said wire mesh to a first substrate; and
a polyester film provided between said adhesive layer and said first substrate,
wherein said antenna structure is configured for coupling to a signal source using a coupling structure comprising:
a first coplanar wave guide on an underside of a second substrate, said first coplanar wave guide coupled, by way of a via, to a microstrip line that is on a top side of said second substrate, said microstrip line feeding said antenna structure, wherein said first coplanar wave guide widens distally from said via;
a second coplanar wave guide mounted upon a top side of a third substrate, said second coplanar wave guide comprising a wide portion that narrows to a narrow portion; and
a solder mask layered between a wide end of said first coplanar wave guide and said wide portion of said second coplanar waveguide,
wherein, when a signal is present on said microstrip line, said signal capacitively couples from said wide end of said first coplanar waveguide to said wide portion of said second coplanar waveguide.

2. The antenna structure as claimed in claim 1, wherein said substrate is polycarbonate.

3. The antenna structure as claimed in claim 2, wherein said wire mesh is located on a top side of said substrate.

4. The antenna structure as claimed in claim 1, wherein said adhesive layer is transparent to light.

5. The antenna structure as claimed in claim 1, wherein said polyester layer is transparent to light.

6. The antenna structure as claimed in claim 1, wherein said substrate is transparent to light.

7. The antenna structure as claimed in claim 1, further comprising—at least one layer of solder mask applied atop said wire mesh.

8. The antenna structure as claimed in claim 1, wherein an antenna having said structure is deployed on a transparent surface.

9. An antenna structure comprising:
a wire mesh provided on a patch and ground plane;
an adhesive layer for attaching said wire mesh to a first substrate;
a polyester film provided between said adhesive layer and said first substrate; and
a reflector adjacent to and spaced apart from said first substrate,
wherein, when said wire mesh is attached to said first substrate, a surface of said substrate is substantially planar and flat,
wherein said antenna structure is configured for coupling to a signal source using a coupling structure comprising:
a first coplanar wave guide on an underside of a second substrate, said first coplanar wave guide coupled, by way of a via, to a microstrip line that is on a top side of said second substrate, said microstrip line feeding said antenna structure, wherein said first coplanar wave guide widens distally from said via;
a second coplanar wave guide mounted upon a top side of a third substrate, said second coplanar wave guide comprising a wide portion that narrows to a narrow portion; and
a solder mask layered between a wide end of said first coplanar wave guide and said wide portion of said second coplanar waveguide,
wherein, when a signal is present on said microstrip line, said signal capacitively couples from said wide end of said first coplanar waveguide to said wide portion of said second coplanar waveguide.

10. The antenna structure as claimed in claim 9, wherein said substrate is color pigmented.

11. The antenna structure as claimed in claim 9, wherein said wire mesh is located on a top side of said first substrate.

12. The antenna structure as claimed in claim 9, further including an L-shaped element located adjacent a transmission cable of said antenna structure, said L-shaped element being for suppressing unwanted current distribution coupled from cable, wherein one face of said L-shaped metal plate is attached to said reflector and another face of said L-shaped metal plate extends into space.

13. The antenna structure as claimed in claim 9, wherein said antenna structure is for deployment within a cavity such that said reflector is inside said cavity.

14. The antenna structure as claimed in claim 13, wherein the cavity forms part of either a wall or a ceiling.

15. A coupling structure for use with an antenna structure, the coupling structure comprising:
a first coplanar wave guide mounted on a first substrate, said first coplanar wave guide being coupled to a microstrip line by way of a via, said microstrip line feeding said antenna structure, wherein said first coplanar wave guide widens distally from said via;
a second coplanar wave guide mounted upon a second substrate, said second coplanar wave guide comprising a wide portion that narrows to a narrow portion; and
a solder mask layered between a wide end of said first coplanar wave guide and said wide portion of said second coplanar waveguide,
wherein, when a signal is present on said microstrip line, said signal capacitively couples from said wide end of said first coplanar waveguide to said wide portion of said second coplanar waveguide.

16. The coupling structure as claimed in claim 15, wherein said coupling structure couples a flat antenna structure to a signal source.

* * * * *